United States Patent
Crews

(10) Patent No.: US 9,267,070 B2
(45) Date of Patent: *Feb. 23, 2016

(54) MONO- AND POLYENOIC ACID AND METAL PARTICLE MIXTURES FOR BREAKING VES-GELLED FLUIDS

(75) Inventor: James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 349 days.

This patent is subject to a terminal disclaimer.

(21) Appl. No.: 13/300,540

(22) Filed: Nov. 18, 2011

(65) Prior Publication Data

US 2013/0130943 A1 May 23, 2013

(51) Int. Cl.
- *C09K 8/68* (2006.01)
- *C09K 8/12* (2006.01)
- *C09K 8/52* (2006.01)

(52) U.S. Cl.
CPC ... *C09K 8/12* (2013.01); *C09K 8/52* (2013.01); *C09K 8/68* (2013.01); *C09K 2208/26* (2013.01); *C09K 2208/30* (2013.01)

(58) Field of Classification Search
CPC .......... C09K 8/588; C09K 8/80; C09K 15/30; C09K 2208/10; C09K 2208/30; C09K 3/1436; C09K 8/032; C09K 8/203; C09K 8/24; C09K 8/32; C09K 8/38; C09K 8/42; C09K 8/54; C09K 8/575; C09K 5/58; C09K 8/06; E21B 43/26; E21B 17/04; E21B 19/155; E21B 29/06; E21B 43/00; E21B 43/1185; E21B 43/14; E21B 43/30; E21B 47/06; E21B 47/065; E21B 47/101; E21B 47/12; E21B 7/061; E21B 10/322; E21B 10/327; E21B 43/12; E21B 43/16; E21B 43/267; E21B 47/00; E21B 47/0002; E21B 47/022; E21B 47/08; E21B 47/091; E21B 47/121; E21B 47/122; E21B 49/00; E21B 49/02; E21B 49/08; E21B 49/088; E21B 7/00
See application file for complete search history.

(56) References Cited

U.S. PATENT DOCUMENTS

| | | | |
|---|---|---|---|
| 5,759,964 A * | 6/1998 | Shuchart | C09K 8/685 540/209 |
| 5,964,295 A | 10/1999 | Brown et al. | |
| 5,979,555 A | 11/1999 | Gadberry et al. | |
| 6,024,915 A * | 2/2000 | Kume | B22F 1/02 419/35 |
| 6,425,277 B2 | 7/2002 | Wiens | |
| 6,703,352 B2 | 3/2004 | Dahayanake et al. | |
| 2003/0134751 A1* | 7/2003 | Lee | C09K 8/536 507/200 |
| 2006/0166838 A1* | 7/2006 | Collins | B01J 13/125 507/219 |
| 2006/0211776 A1* | 9/2006 | Crews | C09K 8/602 516/194 |
| 2007/0151726 A1* | 7/2007 | Crews | C09K 8/602 166/246 |
| 2008/0066916 A1* | 3/2008 | Li | C09K 8/602 166/305.1 |
| 2008/0105438 A1* | 5/2008 | Jordan | C22C 1/0408 166/376 |
| 2010/0263866 A1* | 10/2010 | Huang | C09K 8/506 166/282 |
| 2011/0135953 A1* | 6/2011 | Xu | B22F 1/02 428/548 |

OTHER PUBLICATIONS

Material Safety Data Sheet from Science Lab.*
http://en.wikipedia.org/w/index.php?title=Copper(I I)_chloride &printable=yes downloaded on Jan. 13, 2015.*
http://www.thefreedictionary.com/configured downloaded on Jan. 13, 2015.*
Patent Cooperation Treaty International Search Report and Written Opinion for International Pat. App. No. PCT/US2012/063529 filed on Nov. 5, 2012, mailed on Feb. 21, 2013.

* cited by examiner

*Primary Examiner* — Susannah Chung
*Assistant Examiner* — Kumar R Bhushan
(74) *Attorney, Agent, or Firm* — Cantor Colburn LLP

(57) ABSTRACT

A method for breaking the viscosity of an aqueous fluid gelled with a viscoelastic surfactant (VES) includes: providing an aqueous fluid; adding to the aqueous fluid, in any order, components comprising: a VES comprising a non-ionic surfactant, cationic surfactant, amphoteric surfactant or zwitterionic surfactant, or a combination thereof, in an amount sufficient to form a gelled aqueous fluid comprising a plurality of elongated micelles, an unsaturated fatty acid comprising a monoenoic acid or a polyenoic acid; or a combination thereof; and a plurality of metallic particles to produce a mixture comprising dispersed metallic particles in the gelled aqueous fluid. The method also includes dissolving the metallic particles in the gelled aqueous fluid to provide a source of metal ions and heating the gelled aqueous fluid to a temperature sufficient to cause the unsaturated fatty acid to auto-oxidize to products present in an amount effective to reduce the viscosity.

17 Claims, 2 Drawing Sheets

MONO- AND POLYENOIC ACID AND METAL PARTICLE MIXTURES FOR BREAKING VES-GELLED FLUIDS

BACKGROUND

Viscosity controlled wellbore fluids comprising gels, such as viscoelastic surfactant gels, are used for various purposes in wellbore operations, such as drilling, completion, production and sequestration or other operations, particularly during hydrocarbon recovery operations. These viscosity controlled fluids must be adapted to form high viscosity fluids for operations such as fracturing, but must also be adapted for "breaking" or reducing their viscosity for subsequent operations, such as hydrocarbon recovery operations.

Fracturing fluids are complex and must simultaneously provide high temperature stability at high pump rates and fluid shear rates that may tend to cause the fluids to degrade and prematurely settle out constituents, such as proppant, before the fracturing operation is complete. Various fracturing fluids have been developed, but most commercially used fracturing fluids are aqueous-based liquids or fluids that have either been gelled or foamed using a gelling agent. Polymeric gelling agents, such as solvatable polysaccharides that are gelled by crosslinking to increase viscosity have been used. Non-polymeric viscoelastic surfactant (VES) gelling agents have also been used. In many cases, VES materials are advantageous compared to polymer gelling agents because they employ low molecular weight surfactants rather than high molecular weight polymers and may leave less gel residue within the pores of oil producing formations, leave no filter cake on the formation face and minimal amounts of residual surfactant coating the proppant, and inherently do not create microgels or fish-eye-type polymeric masses.

VES materials also require breaker systems for the non-polymeric VES-based gelled fluids to reduce their viscosity after use. These have generally included using external or reservoir conditions for viscosity reduction (breaking) and VES fluid removal (clean-up) during hydrocarbon production, as well as rearranging, disturbing, and/or disbanding of the VES worm-like micelle structure by contact with hydrocarbons within the reservoir, more specifically contacting and mixing with crude oil and condensate hydrocarbons. While useful, these breaker systems have limitation, including incomplete removal of the VES fluids, resulting in residual formation damage (e.g., impairment of hydrocarbon production). Post-treatment clean-up fluids composed of either aromatic hydrocarbons, alcohols, surfactants, mutual solvents, and/or other VES breaking additives have been employed in an attempt to break the VES fluid for removal, but their effectiveness has been limited, resulting in well sections with unbroken or poorly broken VES-gelled fluid that impairs hydrocarbon production, or in production delays associated with instances where VES breaking and clean-up takes a long time, such as several days up to possibly months to break and then produce the VES treatment fluid from the reservoir.

Internal breakers that are activated within the fluid, such as by downhole temperatures have also been used with VES-gelled fluids, and typically allow a controlled rate of gel viscosity reduction in 1 to 8 hours, similar to gel break times common for conventional crosslinked polymeric fluid systems. VES-gelled fluids are not comprised of polysaccharide polymers that are easily degraded by use of enzymes or oxidizers, but are comprised of surfactants that associate and form viscous rod-shaped or worm-shaped micelle structures. Conventional enzymes and oxidizers have not been found to act and degrade the surfactant molecules or the viscous micelle structures they form. Other internal breakers for VES-gelled fluids have been proposed in U.S. Pat. No. 7,645,724 B2 to Crews which describes aqueous fluids viscosified with viscoelastic surfactants (VESs) that may have their viscosities reduced (gels broken) by the direct or indirect action of a composition that contains at least one unsaturated fatty acid (UFA), such as a monoenoic acid and/or polyenoic acid.

While these internal breakers are very useful, the development of additional internal breakers to provide enhanced control of the breaking of VES fluids is very desirable, particularly in view of the widespread use of these fluids in fracturing and other downhole operations.

SUMMARY

In an exemplary embodiment, a method for breaking the viscosity of an aqueous fluid gelled with a viscoelastic surfactant (VES) is disclosed. The method includes providing an aqueous fluid. The method also includes adding to the aqueous fluid, in any order, components comprising: a VES comprising a non-ionic surfactant, cationic surfactant, amphoteric surfactant or zwitterionic surfactant, or a combination thereof, in an amount sufficient to form a gelled aqueous fluid comprising a plurality of elongated micelles, an UFA comprising a monoenoic acid or a polyenoic acid; or a combination thereof; and a plurality of metallic particles to produce a mixture comprising dispersed metallic particles in the gelled aqueous fluid. The method also, includes dissolving the metallic particles in the gelled aqueous fluid to provide a source of metal ions. The method further includes heating the gelled aqueous fluid to a temperature sufficient to cause the UFA to auto-oxidize to products present in an amount effective to reduce the viscosity of the gelled aqueous fluid, wherein the metal ions comprise an auto-oxidation rate control compound that controls an auto-oxidation rate of the UFA.

In another exemplary embodiment, an aqueous wellbore fluid is disclosed. The fluid includes an aqueous wellbore fluid. The fluid also includes a viscoelastic surfactant (VES) in an amount effective to form a gelled aqueous fluid having a micelle structure of the VES and a viscosity of the gelled aqueous fluid. The fluid further includes an UFA comprising a monoenoic acid or a polyenoic acid; or a combination thereof, that is configured to auto-oxidize and form products present in an amount effective to reduce the viscosity of the gelled aqueous fluid by disaggregating or rearranging the micelle structure of the VES when the gelled aqueous fluid is heated to a temperature from about 70° F. to about 300° F. Still further, the fluid includes a plurality of metal particles dispersed within the gelled aqueous fluid and configured to dissolve in the aqueous fluid to provide a source of metal ions, wherein the metal ions comprise an auto-oxidation rate control compound that controls an auto-oxidation rate of the UFA and rate at which the amount of products effective to reduce the viscosity of the gelled aqueous fluid are formed.

BRIEF DESCRIPTION OF THE DRAWINGS

Referring now to the drawings wherein like elements are numbered alike in the several Figures.

DETAILED DESCRIPTION

Figure 1:
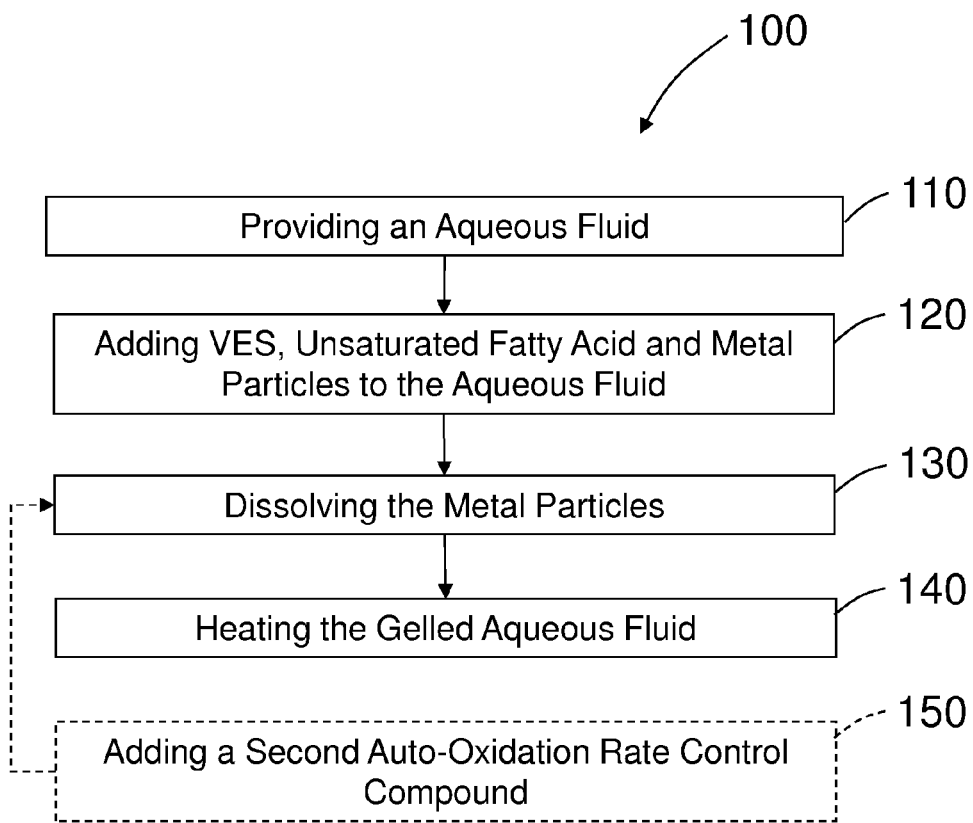
FIG. 1 is a flowchart illustrating an exemplary embodiment of a method of affecting viscosity as disclosed herein.

Referring to the Figures, and particularly FIG. 1, a method 100 for breaking the viscosity of aqueous fluids gelled with VES (i.e. surfactants that develop viscosity in aqueous brines by formation of rod-shaped or worm-shaped micellar structures) is disclosed. The method 100 may advantageously be employed to provide an internal breaker to break the viscosity of aqueous fluids gelled with VES, but may also be employed to provide an external breaker. The method 100 will allow selectively controllable breaks, such as within about 1 to about 48 hours. The method 100 provides improved control over various aspects of the breaks, including, without limitation, the timing of breaking of the aqueous fluids gelled with VES by providing a selectively controllable breaking mechanism. The improved control may include selectively controlling the onset or initiation of breaking, the rate at which the viscosity is broken, and the extent or extensiveness of the breaking that occurs. The extent or extensiveness to which the breaking occurs may be assessed in any suitable manner, such as by measuring the volume percentage of the fluid that has its viscosity reduced, or by measuring the reduction of the viscosity that occurs during breaking, or the like. The method utilizes the dissolution of metallic particles to provide a source of transition metal ions sufficient to promote and/or increase the rate of auto-oxidation of an UFA sufficient to break a VES-gelled aqueous fluid. This may enable breaking, for example, at a lower temperature, or over a wider temperature range, or at higher breaking rates in order to achieve enhanced viscosity break characteristics, such as nearly right angle break profiles corresponding to very high rates of change of the viscosity, including rapid increases, decreases or rapid increases followed by rapid decreases.

U.S. Pat. No. 7,645,724 B2 to Crews, which is hereby incorporated herein by reference in its entirety, describes aqueous fluids viscosified with VESs that may have their viscosities reduced (gels broken) by the direct or indirect action of a composition that contains at least one UFA, such as a monoenoic acid and/or polyenoic acid. In the '724 patent, the UFAs were auto-oxidized into products, such as aldehydes, ketones and saturated fatty acids, sufficient to break the VES gel. The '724 patent also indicated that rate control compounds that included transition metal ions could be used to control the rate of auto-oxidation, and hence the breaking characteristics of the VES fluid. This application discloses particular advantages that may be gained by the incorporation of metallic particles into the aqueous fluid, particularly selectively controllable dissolution of the metallic particles and release of their metal ions as rate control compounds to control the auto-oxidation reaction and breaking characteristics of gelled aqueous fluids that include VES and monoenoic acid and/or polyenoic acid breakers.

The method 100 for breaking the viscosity of an aqueous fluid gelled with a viscoelastic surfactant (VES) includes providing 110 an aqueous fluid. The method 100 also includes adding 120 to the aqueous fluid, in any order, components comprising: a VES comprising a non-ionic surfactant, cationic surfactant, amphoteric surfactant or zwitterionic surfactant, or a combination thereof, in an amount sufficient to form a gelled aqueous fluid comprising a plurality of elongated micelles, an UFA comprising a monoenoic acid or a polyenoic acid; or a combination thereof; and a plurality of metallic particles to produce a mixture comprising dispersed metallic particles in the gelled aqueous fluid. The method 100 also includes dissolving 130 the metallic particles in the gelled aqueous fluid to provide a source of metal ions. The method 100 further includes heating 140 the gelled aqueous fluid to a temperature sufficient to cause the UFA to auto-oxidize to products present in an amount effective to reduce the viscosity of the gelled aqueous fluid, wherein the metal ions comprise an auto-oxidation rate control compound that controls an auto-oxidation rate of the UFA. Dissolving 130 and heating 140 may be done in any order, including simultaneously. In other words, the dissolving 130 of the metallic particles can be performed before and/or at the same time as thermally inducing UFAs auto-oxidation by heating 140. In one embodiment, dissolving 130 does not need to occur before heating 140 the fluid, but preferably before the auto-oxidation of the UFA. Method 100 and adding 120 may also optionally include adding 150 a second auto-oxidation rate control compound to the aqueous fluid.

Providing 110 of an aqueous fluid may include any suitable aqueous fluid, particularly various wellbore fluids, and more particularly various well bore fluids used in well drilling, completion and production operations. In particular, providing 110 of an aqueous fluid may include various aqueous fracturing fluids. Method 100 is particularly useful for controlled viscosity enhancement, reduction or enhancement followed by reduction of VES based fracturing fluids. Method 100 may also be used for breaking VES gravel pack and loss circulation pill fluids.

The method 100 also includes adding 120 to the aqueous fluid, in any order, components comprising: a VES comprising a non-ionic surfactant, cationic surfactant, amphoteric surfactant or zwitterionic surfactant, or a combination thereof, in an amount sufficient to form a gelled aqueous fluid comprising a plurality of elongated micelles, an UFA comprising a monoenoic acid or a polyenoic acid; or a combination thereof; and a plurality of metallic particles to produce a mixture comprising dispersed metallic particles in the gelled aqueous fluid. In one embodiment, the VES is added to the aqueous fluid to form the gelled aqueous fluid prior to the addition of the other constituents. In other embodiments, the UFA or metallic particles, or both, may be added prior to adding the VES. In yet another embodiment, these constituents may be added simultaneously. Adding 120 may also include various conventional mixing operations to form the gelled aqueous fluid, mix the UFA into the aqueous fluid and disperse the metallic particles forming a mixture of the constituents. In one embodiment, the mixture may be a homogeneous mixture of the constituents such that the gelled aqueous fluid is homogeneous. In another embodiment, the mixture may be a heterogeneous mixture of the constituents such that the gelled aqueous fluid is heterogeneous. In addition to the VES, UFA and metal particles, a second auto-oxidation rate control compound may also be incorporated during adding 120 to promote or enhance the control of auto-oxidation of the UFA.

The breaker components herein, including the metallic particles, can be added safely and easily to the gel during batch mixing of a VES-gel treatment, or added on-the-fly during continuous mixing of a VES-gel treatment using a liquid additive metering system, or the components can be used separately, if needed, as an external breaker solution to remove VES gelled fluids already placed downhole. The mono- and/or polyenoic acid oils are not solubilized in the brine, but rather interact with the VES surfactant to be dispersed and form an emulsion (oil in water type emulsion) and thus there is an oil-stabilized emulsion dispersed in the "internal phase" as a "discontinuous phase" of the brine medium/VES fluid which is the "outer phase" or "continuous phase". It appears in most cases the UFAs are evenly dispersed and are incorporated within the viscous rod- or worm-like shape micelles. The incorporation of the UFAs into (within or a part of) the VES micelles does not disturb the viscosity yield of the VES micelles at the levels or amounts of UFAs needed to obtain a complete VES gel viscosity break. However, in some cases it may be desirable or it is allowable to add one or more emulsifying agents to further enhance the dispersion and/or stability of the UFA oils within the VES fluid, such as an emulsifying surfactant, POE (20) sorbitan monolaurate known as Tween 20, lecithin, and the like.

Surprisingly and unexpectedly, method 100 employs UFAs comprising monoenoic acids and polyenoic acids and metallic particles as breakers, including, in one embodiment, oils that contain a relatively high amount of either monoenoic or polyenoic acids, or both. There are many books and other literature sources that list the multiple types and amounts of fatty acids compositions of oils and fats available from plant, fish, animal, and the like. A polyenoic acid is defined herein as any of various fatty acids having more than one double bond (allyl group) in the carbon chain, e.g. as in linoleic acid. Correspondingly, a monoenoic acid is a fatty acid having only one double bond (allyl group). The term UFA is defined herein as oils or fats containing one or the other or both monoenoic and polyenoic fatty acids. Other suitable polyenoic acids include omega-3 fatty acids, and omega-6 fatty acids, stearidonic acid, eleostearic acid, eicosadienoic acid, eicosatrienoic acid, arachidonic acid or eicosatetraenoic acid (ETA), eicosapentaenoic acid (EPA), docosapentaenoic acid, docosahexaenoic acid, cis-linoleic acid, cis-linolenic acid, gamma-linolenic acid or conjugated polyenes, and combinations (e.g., mixtures) thereof. Other suitable monoenoic acids include obtusilic acid, caproleic acid, lauroleic acid, linderic acid, myristoleic acid, physeteric acid, tsuzuic acid, palmitoleic acid, petroselinic acid, oleic acid, vaccenic acid, gadoleic acid, gondoic acid, cetoleic acid, nervonic acid, erucic acid, elaidic acid or t-vaccenic acid, or combinations (e.g., mixtures) thereof.

Oils relatively high in monoenoic and polyenoic acids include flax (linseed) oil, soybean oil, olive oil, canola (rapeseed) oil, chia seed oil, corn oil, cottonseed oil, evening primrose oil, grape seed oil, pumpkin seed oil, safflower oil, sunflower oil, walnut oil, peanut oil, various fish oils, mammal oils or animal oils or fats, or combinations thereof.

Any of these oils or fats may be partially hydrogenated, or may contain original or additional preservatives, such as tocopherols, and the like. Additionally any one or more of these oils can be "aged" before use to adjust the product's auto-oxidation activity, along with any one or more reagent or technical grade fatty acids. Allowing a specific fatty acid or UFA oil to "age" allows auto-oxidation to initiate and progress dependent on the amount of time, environmental conditions (temperature, exposure to atmosphere (e.g., oxygen), etc.), presence of other compounds (tocopherols, metal ions, etc.), and the like.

It appears that the more double-bonded carbons on the fatty acid carbon chain the more active that fatty acid will be in auto-oxidation, that is, these materials auto-oxidize easier and more quickly. This seems to be a general rule, although other components in the oil may alter this rule. Table 1 lists the relative rates of oxidation of common fatty acids, from the "Autoxidation" section within "Chemical Reactions of Oil, Fat, and Based Products", Department of Engineering, Instituto Superior T'echnico, Lisbon, Portugal, October 1997.

TABLE 1

Relative Oxidation Rates of Some Common Fatty Acids

| Fatty Acid | Total amount of carbon atoms | Number of double carbon bonds | Relative rate of oxidation |
| --- | --- | --- | --- |
| Stearic | 18 | 0 | 1 |
| Oleic | 18 | 1 | 100 |
| Linoleic | 18 | 2 | 1200 |
| Linolenic | 18 | 3 | 2500 |

UFAs have been found to break down by "auto-oxidation" into a gamut of VES-breaking products or compositions. Oils having various monoenoic and polyenoic acids uniquely show the breakdown of the VES surfactant micelle structure by the presence of these auto-oxidation generated byproducts. Auto-oxidation is also known as autoxidation and lipid peroxidation which includes the oxidation of UFAs. Auto-oxidation in this context also includes a chain reaction—multiple steps and chemical species occur in the oxidative breakdown. Various hydroperoxides can be formed in these auto-oxidations, and end products typically include carbonyl compounds (various aldehydes and ketones), alcohols, acids, and "hydrocarbons" of various types, e.g. alkanes, saturated fatty acids and the like, and mixtures thereof. A variety of technical books and papers list many of the numerous products generated by auto-oxidation (autoxidation) of UFAs. Fatty acids may also decompose in a water medium and alkaline condition by hydrolysis.

Without being limited by theory, other olefins (e.g. allyl group compounds) may also be useful to break VES gelled fluids. Without being limited by theory, other mechanisms, other than oxidation or hydrolysis, may also generate VES breaking compounds from olefins and olefin derivatives in accordance with this disclosure.

In one embodiment these gel-breaking products work by rearrangement of the VES micelles from rod-shaped or worm-shaped elongated structures to spherical structures, such as by the collapse or rearrangement of the viscous elongated micelle structures to non-viscous more spherical micelle structures. Disaggregating may be understood in one embodiment when the micelles are not closely associated physically, that is no longer aggregated or physically interacted together resulting in reduced fluid viscosity, as contrasted with rearrangement which may be understood as a different physical and chemical arrangement or aggregation of the multi-surfactant micelle that has reduced viscosity.

The auto-oxidation is believed to be triggered or initiated or enhanced by heat. These mono- and polyenoic acids will slowly to fairly rapidly, upon heating or subjecting the acids to a temperature, auto-oxidize into the VES gel breaking compounds with the addition of or in the absence of any other agent. The amount of altered or oxidized UFA needed to break a VES-gelled fluid appears to be VES concentration and temperature dependent, with typically more needed as the VES concentration increases and less needed as fluid temperature increases. Once a fluid is completely broken at an elevated temperature, and then cooled, a degree of viscosity reheal may occur, but in most cases no reheal in viscosity will occur and no phase separation of the VES occurs upon fluid cool down, that is when the test fluid is left at test temperature for a sufficient amount of time for complete to near-complete auto-oxidation of the monoenoic and/or polyenoic acids to occur.

Controlled viscosity reduction rates can be achieved in one embodiment by heating the UFA to a temperature of from about 70° F. to about 300° F. (about 21 to about 149° C.), and more particularly to a temperature of about 80° F. (27° C.) to about 280° F. (about 138° C.), or even more particularly about 100° F. (38° C.) to about 280° F. In another embodiment, the fluid designer would craft the fluid system in such a way that the VES gel would break at or near the formation temperature after fracturing was accomplished.

Fluid design would be based primarily on formation temperature, i.e. the temperature the fluid will be heated to naturally in the formation once the treatment is over. Fluid design may also be based on the expected cool down of the fluid during a treatment. In many cases the fracturing fluid may only experience actual reservoir temperature for 5% to 25% of the job time, and close to 50% of the fluid is never exposed to the original reservoir temperature because of the cool down of the reservoir by the initial fracturing fluid placed into the reservoir. It is because a portion of the fracturing fluid will not see the original reservoir temperature that a cooler temperature is selected that will represent what the fluid will most probably see or experience, and thus laboratory break tests, are run at this cooler temperature. There would generally be no additional temperature the VES fluid would see other than original reservoir temperature.

The disclosed breaker system may be used for controlling viscosity reduction and improving the clean-up of VES based fracturing fluids. The breaking system may also be used for breaking and improving the clean-up of gravel pack fluids, acidizing or near-wellbore clean-up diverter fluids, loss circulation pills and drilling fluids composed of VES. The breaker system may also work for foamed fluid applications (hydraulic fracturing, acidizing, and the like), where $N_2$ or $CO_2$ gas is used for the gas phase. In one embodiment, this VES breaking method is a significant improvement in that the release of metal ions can be delayed to provide a "delayed release", and thus the metal ions will have reduced or limited initial influence on catalyzing the auto-oxidation of UFAs. In another example, the use of this internal breaker system in combination with external downhole breaking conditions should help assure and improve hydrocarbon production compared to prior art that uses only external mechanisms to break the VES fluid for effective and complete VES fluid clean-up after a treatment.

In one embodiment, the compositions herein through auto-oxidation, which is promoted by the metallic particles, into by-products will directly degrade or digest the gel created by a VES in an aqueous fluid, and alternatively will reduce the viscosity of the gelled aqueous fluid either directly, or by disaggregation or rearrangement of the VES micellar structure (e.g. collapsing or disturbing the structure).

In another embodiment, the composition may be modified to slow down or to increase the auto-oxidation of the UFAs using a second rate control compound in addition to the metallic particles and associated metallic ions described herein. Addition of second rate control compounds that influence the rate of auto-oxidation is an important option for the methods and fluids herein, in particular for the lower temperatures to increase the auto-oxidation rate and at higher temperatures to slow down the auto-oxidation rate. Second rate control compounds that may be used for slowing down rate of monoenoic and polyenoic acids may be antioxidants such as, but not limited to tocopherol (vitamin E), ascorbic acid (vitamin C), butylated hydroxytoluene (BHT) and other like preservatives, chelants (such as citric acid, phosphates, and EDTA), amino acids, proteins, sugar alcohols (e.g. mannitol, xylitol, lactitol, and sorbitol), alkaline and alkaline earth metal salts (such as NaCl, $MgCl_2$, $CaCl_2$, NaBr and $CaBr_2$), and the like. Second rate control compounds that may increase the rate of auto-oxidation may be oxidants or pro-oxidants such as, but not limited to a persulfate, percarbonate, perbromate, perborate, bromate, chlorite, chlorate, hypochlorite, urea peroxide, hydrogen peroxide or sodium bromide, or a combination thereof, and additional (other than the metallic particles) sources of iron, copper, manganese and other transition metals, and the like. It should be noted that there are numerous compounds that may be of utility for regulating the rate of auto-oxidation. The proportion of rate control compounds that may be advantageously used may range from a lower limit of about 0.00001% by weight to an upper limit of about 62% by weight, based on the total weight of fluid, and alternatively from a lower limit of 0.0001% by weight and/or to an upper limit of about 45% by weight. It can be noted that rate controllers used toward the lower limit may be items such as metal ions and rate controllers employed toward the upper limit may be items such as monovalent and/or divalent salts. As will be shown, chelation of the metal ions tends to slow the rate of auto-oxidation as compared with non-chelated forms of the same metal ions. In one non-limiting understanding, the use of metal ions (whether or not chelated) may be understood as "catalyzing" the auto-oxidation of the UFA.

The composition of the aqueous fluid includes metallic particles that may be dissolved to provide at least one metal ion source where the goal is to deliver at least one metal ion to the VES-gelled system to affect auto-oxidation of the UFA. The metallic particles and metal ions may include any suitable metal, and more particularly may be selected from transition metals, including metals selected from Group VA, VIA, VIIA, VIIIA, IB, IIB, IIIB or IVB of the Periodic Table (previous IUPAC American Group notation), or an alloy thereof, or a composite thereof, or a cermet thereof, or a combination thereof. More particularly, these may include, for example, Fe, Cu, Mn, Co, Zn, Ni, V, Pt, Sn, Al, Mo or Pd, or an alloy thereof, or a composite thereof, or a cermet thereof, or a combination thereof.

Any suitable metallic particles may be added to the aqueous fluid in accordance with method 100, and adding 120 may be performed in any suitable manner, including as a free-flowing powder of the metallic particles, or by premixing the metallic particles into the VES, or a combination thereof. Suitable metallic particles include those described above, which may be configured to be dissolved in the aqueous fluid to provide a source of transition metal ions, and particularly metallic cations that may provide metal-mediated or metal-catalyzed auto-oxidation of the UFA and breaking of the gelled aqueous fluid. The metallic particles may be configured for selectively controllable dissolution and release of their associated cations in the aqueous fluid as described herein. The metallic cations may also interact or react with other constituents that may be added to the aqueous fluid, including the other breaking constituents described herein.

The metallic particles may have any suitable size, shape, composition and morphology (i.e. they may be substantially solid or porous or comprise an agglomeration or consolidation of several particles), but will preferably be configured to provide a predetermined amount of the metallic cations and a predetermined dissolution characteristic, such as a predetermined onset of dissolution, rate of dissolution, extent of dissolution and the like. In certain embodiments, the metallic particles may comprise substantially spherical solid or porous particles. In other embodiments, the metallic particles may have non-spherical shapes, including platelets, rods or other non-spherical shapes or rod-like shapes. In yet other embodiments, the particles may include an agglomeration or consolidation of a number of smaller particles as a powder compact or other consolidated form, and may have an open structure between the agglomerated or consolidated particles to provide a high surface area analogous to a zeolite.

Figure 2:
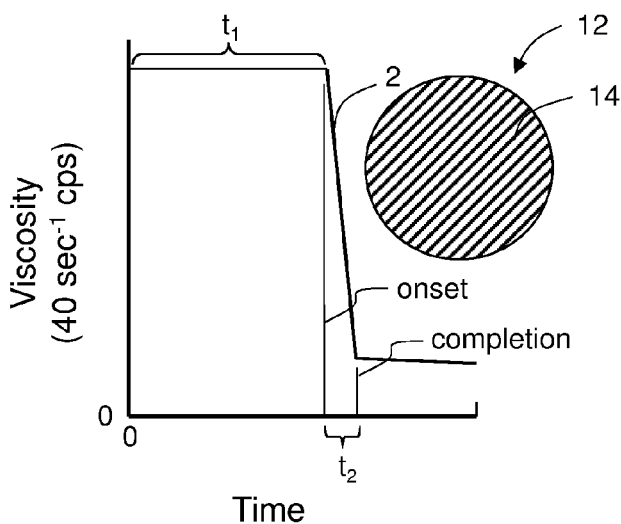
FIG. 2 is a schematic illustration of viscosity as a function of time for an exemplary embodiment of an aqueous fluid and method of affecting viscosity of the fluid as disclosed herein.
Figure 3:
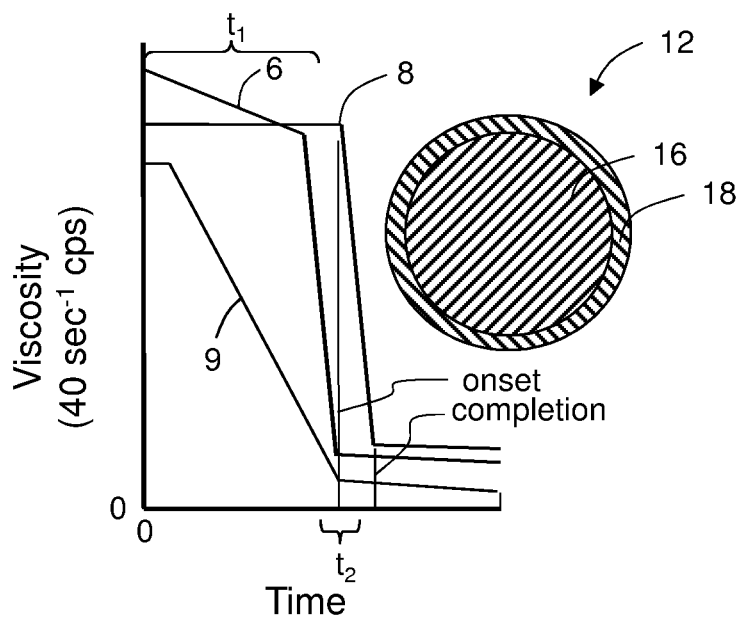
FIG. 3 is a schematic illustration of viscosity as a function of time for a second exemplary embodiment of an aqueous fluid and method of affecting viscosity of the fluid as disclosed herein.

In one embodiment, the metallic particles 12 may be uncoated metallic particles 14, such that the particles begin dissolving and affect auto-oxidation of the UFA and breaking immediately upon being added to the aqueous fluid, or if encapsulated as described herein, when released into the gelled aqueous fluid to provide source of transition metal ions sufficient to cause metal-mediated or metal-catalyzed auto-oxidation of the UFA and breaking of the gelled aqueous fluid as described herein as shown schematically in FIG. 2 by curve 2. It includes an interval $t_1$ during which an encapsulant dissolves and a second interval $t_2$ during which the uncoated metallic particle 14 dissolves. In another embodiment, the metallic particles 12 may be coated and include a coating layer 16 and a particle core 18 as shown in FIG. 3. It includes an interval $t_1$ during which the coating layer 16 dissolves and a second interval $t_2$ during which the particle core 18 dissolves. The coating layer, for example, may be selected to dissolve at a selectively controllable rate to provide a working interval for use of the gelled aqueous fluid, such as use in a fracturing operation, and may cause the viscosity decrease as shown in curve 6 or remain substantially the same as shown in curve 8. Upon dissolution of the coating layer 16, the particle core 14 may also be selected to provide selectively controllable dissolution sufficient to provide metal-mediated or metal-catalyzed breaking of the gelled aqueous fluid as described herein and cause a rapid break in the viscosity of the gelled aqueous fluid, such as a desirable right angle break or a break that occurs at a substantially right angle. All manner of coated metallic particles may be employed. The coated metallic particles described in co-pending patent applications US2011-0135953 A1 filed on Dec. 8, 2009 and U.S. Ser. Nos. 13/220,824, 13/220,832 and 13/220,822 filed on Aug. 30, 2011, and assigned to the same assignee as this application, Baker Hughes, Inc., and which are all incorporated by reference herein in their entirety, are particularly useful. These applications describe coated metallic particles having nanoscale coatings (e.g., about 0.5 nm to about 2500 nm) of Al, Zn, Zr, Mn, Mg, Mo, Ti, Fe, Si, Ca or Sn, or an oxide, carbide or nitride thereof, or a cermet thereof, or a combination of any of the aforementioned materials, wherein the coating layer has a chemical composition and the particle core has a chemical composition that is different than the chemical composition of the coating layer. The coating layers are formed on particle cores of core material, including, but not limited to, those having electrolytically reactive particle core materials, including those having a standard oxidation potential greater than or equal to that of Zn, including Mg, Al, Mn, or Zn, or a combination thereof. The particle cores have average particle sizes of about 50 nm or greater. The metallic particles are particularly well-suited for selectively controllable dissolution in a wellbore fluid, such as the aqueous wellbore fluids described herein, and particularly may be configured for rapid dissolution in these fluids. In addition to the coating materials described above, in an exemplary embodiment, a coated particle having a nanoscale coating that includes Al, Zn, Zr, Mn, Mg, Mo, Ti, Fe, Ni, Cu, Co, Cr, V, Pt, Pd, Si, Ca or Sn, or an oxide, carbide or nitride thereof, or a combination of any of the aforementioned materials, and wherein the coating layer has a chemical composition and the particle core has a chemical composition that is different than the chemical composition of the coating layer, may be particularly desirable. In this embodiment, the particle core may include, for example, a transition metal selected from Group VA, VIA, VIIA, VIIIA, IB, IIB, IIIB thereof, or a composite thereof, or a cermet thereof, or a combination thereof. In another exemplary embodiment, the nanoscale coating layer may have thickness range of about 0.5 nm to about 2500 nm, and a range of metallic particle sizes (i.e. particle core with coating layer), including an average particle size of about 8 nm to about 250 µm, and more particularly, an average particle size of about 10 nm to about 20 µm, and even more particularly, an average particle size of about 30 nm to about 10 µm.

The metallic particles may also be deformed to incorporate nanostructuring in the coating layers or particle cores, or both. As used herein, a nanostructured material is a material having a grain size, or a subgrain or crystallite size, less than about 200 nm, and more particularly a grain size of about 10 nm to about 200 nm, and even more particularly an average grain size less than about 100 nm. The nanostructure may include high angle boundaries, which are usually used to define the grain size, or low angle boundaries that may occur as substructure within a particular grain, which are sometimes used to define a crystallite size, or a combination thereof. The nanostructure may be formed in the metallic particle, including in the case of coated particles the particle core or the coating layer or both, by any suitable method, including deformation-induced nanostructure such as may be provided by ball milling a powder to provide metallic particles, and more particularly by cryomilling (e.g., ball milling in ball milling media at a cryogenic temperature or in a cryogenic fluid, such as liquid nitrogen). The stored strain energy associated with nanostructuring may also be utilized to affect selectively controllable dissolution of the metal particles, particularly even dissolution rates that are higher than the dissolution rate of an identical particle that does not have a nanostructured microstructure, i.e., one having stored strain energy associated with the nanostructuring. As also shown comparatively with regard to the coated metallic particles described herein with reference to FIG. 3, in one embodiment an uncoated metallic particle 12 may be selected and configured to begin dissolution more rapidly (i.e., it has a shorter $t_1$) because it does not have a coating layer and may dissolve at a slower rate (i.e., have a longer $t_2$) than a coated particle as illustrated by curve 9.

In an exemplary embodiment, the coating layer, including its composition and size or thickness may, for example, be selected to dissolve at a predetermined rate in the aqueous fluid, and provide a first characteristic and coating working interval for the fluid, such as a coating interval corresponding to a wellbore treatment, such as a fracturing treatment. The coating layer may, for example, be selected to maintain the viscosity of the aqueous fluid at a predetermined level, such as a relatively high level, sufficient to affect a wellbore treatment, such as fracturing. The coating layer may comprise any suitable material, including a polymer, metal, cermet or ceramic, or a composite thereof, or a combination thereof. In one embodiment, the coating layer may include a water soluble or water permeable polymer. In another embodiment, the coating layer may include a metallic coating layer comprising Al, Zn, Zr, Mn, Mg, Mo, Ti, Fe, W, V, Pt, Pd, Ni, Cu, Co, Cr, Si, Ca or Sn, or an oxide, carbide or nitride thereof, or a composite thereof, or a cermet thereof, or a combination of any of the aforementioned materials. The coating layer may also include multiple layers of the materials mentioned. In one embodiment, the coating layer may have an average thickness of about 0.5 nm to about 2500 nm. The metal ions released by dissolution of the coating layer may be selected to initiate or promote metal-mediated or metal-catalyzed autooxidation of the UFA. The particle core, including its composition and size, may, for example, be selected and configured to dissolve at a predetermined rate in the aqueous fluid, and provide a second characteristic and a core working interval for the fluid, such as an interval corresponding to completely breaking the gelled aqueous fluid. The particle core may, for example, be selected to provide a source of a transition metal ion sufficient to promote metal-mediated or metal-catalyzed auto-oxidation of the UFA and breaking of the gelled aqueous fluid as described herein and reduce the viscosity of the aqueous fluid to a predetermined level, such as a relatively low level, sufficient to enable removal of the aqueous fluid from the wellbore. Any suitable material may be used for the particle core, including various transition metals or transition metal alloys. In one embodiment, the particle core material may include Fe, Cu, Mg, Mn, Co, Ca, Si, Ti, Zn, Zr, Ni, V, Pt, Si, Sn, Al, Mo or Pd, or an alloy thereof, or a composite thereof, or a cermet thereof, or combination thereof. The particle core may have any suitable thickness, including those described herein.

Figure 4:
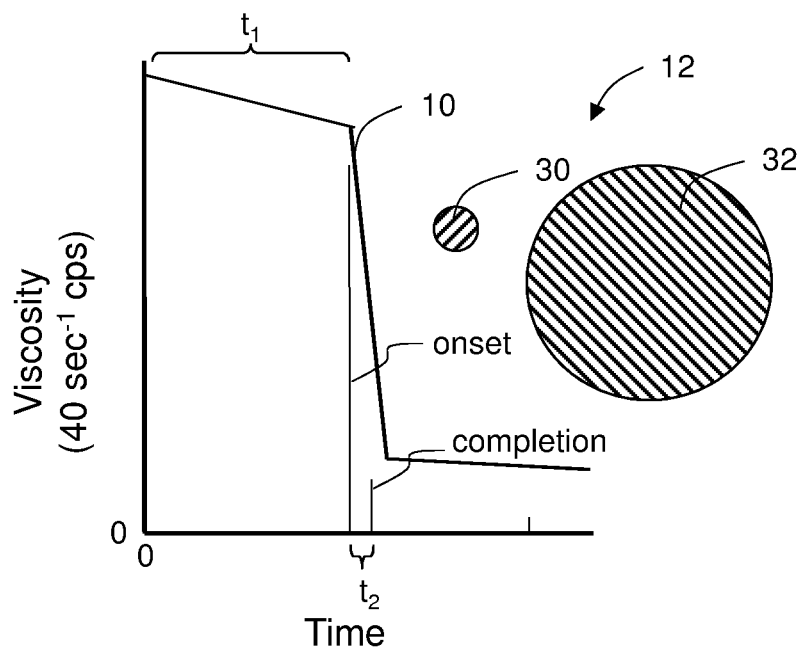
FIG. 4 is a schematic illustration of viscosity as a function of time for a third exemplary embodiment of an aqueous fluid and method of affecting viscosity of, the fluid as disclosed herein.

Whether coated or uncoated, the plurality of metallic particles may be formed from one material or combination of materials, or may be formed from more than one material, or more than one combination of materials. Further, the metallic particles may have a single or unimodal average particle size or size distribution of particle sizes, or may have a plurality of average particle sizes or size distributions (multimodal average particle sizes or size distributions). Either or both of these aspects may be used to affect a variable response within the gelled aqueous fluid. For example, a plurality of small metallic particles 12 of a first metallic material 30 can be used to rapidly dissolve and release sufficient first metallic cations to cause a gradual decrease in the viscosity over a first selectively controllable time ($t_1$) interval and plurality of larger particles of a second metallic material 32 may be selected to release sufficient second metallic cations to cause a break or rapid reduction in the viscosity over a second later time interval ($t_2$) as illustrated by dissolution curve 10 in FIG. 4.

It is difficult, if not impossible, to specify with accuracy in advance the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the concentration of VES used; the particular plant, fish or animal oil used; the special or particular blend of fatty acid oils; the particular UFA used; the particular oil used to carry the UFA; the type and amount of rate controlling agent or agents; the temperature of the fluid; the downhole pressure of the fluid, the starting pH of the fluid; and the complex interaction of these various factors. Nevertheless, in order to give a general feel for the proportions of the various breaking components to be used in the methods and fluids herein, approximate ranges will be provided. The amount of UFA that may be effective in the methods and compositions may range from about 500 to about 25,000 ppm, based on the total amount of the fluid. In another non-restrictive version, the amount of UFA may range from a lower limit of about 1000 and/or to an upper limit of about 15,000 ppm. The amount of metallic particles that may be effective in the methods and compositions may range from about 1 to about 10,000 ppm, based on the total amount of the fluid. In another non-restrictive embodiment, the amount of metallic particles may range from a lower limit of about 10 and/or to an upper limit of about 2,000 ppm. The metallic particles may be selected to provide a suitable amount of transition metal ions, as described herein. In one embodiment, the transition metal ions may be present in an amount of about 0.001 to about 4000 ppm of the gelled aqueous fluid, and more particularly an amount of about 0.01 to about 1200 ppm of the gelled aqueous fluid, and even more particularly an amount of about 0.1 to about 400 ppm of the gelled aqueous fluid.

Any suitable mixing apparatus may be used for this procedure. In the case of batch mixing, the VES and the aqueous fluid are blended for a period of time sufficient to form a gelled or viscosified aqueous solution. The oil containing the monoenoic and/or polyenoic acid or the neat UFA may be added at the time the fluid is formulated or later. The VES that is useful in the present methods and compositions can be any of the VES systems that are familiar to those in the well service industry, and may include amines, amine salts, quaternary ammonium salts, amidoamine oxides or amine oxides, or a combination thereof, and the like.

Viscoelastic surfactants improve the fracturing (frac) fluid performance through the use of a polymer-free system. These systems, compared to polymeric based fluids, can offer improved viscosity breaking, higher sand transport capability, are in many cases more easily recovered after treatment than polymers, and are relatively non-damaging to the reservoir with appropriate contact with sufficient quantity of reservoir hydrocarbons, such as crude oil and condensate. The systems are also more easily mixed "on the fly" in field operations and do not require numerous co-additives in the fluid system, as do some prior systems.

The VESs suitable for use herein include non-ionic, cationic, amphoteric, or zwitterionic surfactants, or a combination thereof. Suitable VES are described in U.S. Pat. Nos. 5,964,295; 5,979,555; U.S. Pat. No. 6,425,277 and U.S. Pat. No. 6,703,352. Specific examples of zwitterionic/amphoteric surfactants include dihydroxyl alkyl glycinate, alkyl ampho acetate or propionate, alkyl betaine, alkyl amidopropyl betaine or alkylimino mono- or di-propionates derived from certain waxes, fats and oils, or a combination thereof. Quaternary amine surfactants are typically cationic, and the betaines are typically zwitterionic. The VES thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making them less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one embodiment, R is an alkyl or alkylamido group averaging from about 8 to 16 carbon atoms and R' are independently alkyl groups averaging from about 2 to 3 carbon atoms. In an alternate, embodiment, the amidoamine oxide gelling agent is Akzo Nobel's Aromox APA-T formulation, which should be understood as a dipropylamine oxide since both R' groups are propyl.

Suitable amine gelling materials include, but are not limited to, ClearFRAC™, which may also comprise greater than 10% of a glycol. One preferred VES is an amine oxide. As noted, a particularly preferred amine oxide is APA-T, sold by Baker Hughes as SurFRAQ™ VES. SurFRAQ is a VES liquid product that is 45-55% Aromox APA-T sold by Akzo Nobel and from about 35-45% propylene glycol. These viscoelastic surfactants are capable of gelling aqueous solutions to form a gelled base fluid. The additives of these methods and compositions are used to prepare a VES system sold by Baker Hughes as DiamondFRAQ™. Diamond FRAQ™ with its assured breaking technology overcomes reliance on external reservoir conditions in order to break.

The amount of VES included in the fracturing fluid depends on at least two factors. One involves generating enough viscosity to control the rate of fluid leak off into the pores of the fracture, and the second involves creating a viscosity high enough to keep the proppant particles suspended therein during the fluid injecting step, in the non-limiting case of a fracturing fluid. Thus, depending on the application, the VES is added to the aqueous fluid in concentrations ranging from about 0.5% to 25% by volume of the total aqueous fluid, alternatively up to about 12% by volume of the total aqueous fluid (from about 5 to 120 gallons per thousand gallons (gptg)). In another embodiment, the range for the present compositions and method 100 is from about 0.6% to about 10.0% VES by volume of the total aqueous fluid. In an alternate embodiment, the amount of VES ranges from about 0.8% to about 6.0% by volume of the total aqueous fluid.

It is expected that the breaking compositions herein can be used to reduce the viscosity of a VES-gelled aqueous fluid regardless of how the VES-gelled fluid is ultimately utilized. For instance, the viscosity breaking compositions could be used in all VES applications including, but not limited to, VES-gelled friction reducers, VES viscosifiers for loss circulation pills, drilling fluids, fracturing fluids (including foamed fracturing fluids), gravel pack fluids, viscosifiers used as diverters in acidizing (including foam diverters), VES viscosifiers used to clean up drilling mud filter cake, remedial clean-up of fluids after a VES treatment (post-VES treatment) in regular or foamed fluid forms (i.e. the fluids may be "energized") with or the gas phase of foam being $N_2$ or $CO_2$, and the like.

A value of the methods and compositions herein is that a fracturing or other fluid can be designed to have enhanced breaking characteristics. That is, fluid breaking is no longer dependent on external reservoir conditions for viscosity break: the rate of viscosity reduction, if complete break is achieved/occurs throughout the reservoir interval, and the like. Importantly, better clean-up of the VES fluid from the fracture, proppant, and wellbore can be achieved thereby. Better clean-up of the VES directly influences the success of the fracture treatment, which is an enhancement of the well's hydrocarbon productivity. VES fluid clean-up limitations and failures of the past can now be overcome or improved by the use of DiamondFRAQ™ improved VES gel clean-up technology.

In order to practice the methods and compositions herein, an aqueous fracturing fluid, as a non-limiting example, is first prepared by blending a VES into an aqueous fluid. The aqueous fluid could be, for example, water, brine, aqueous-based foams or water-alcohol mixtures. Any suitable mixing apparatus may be used for this procedure. In the case of batch mixing, the VES and the aqueous fluid are blended for a period of time sufficient to form a gelled or viscosified solution. Alternatively, the breaking composition may be added separately.

Propping agents are typically added to the base fluid after the addition of the VES. Propping agents include, for example, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 $kg/m^3$) of fracturing fluid composition, but higher or lower concentrations can be used as the fracture design required. The base fluid can also contain other conventional additives common to the well service industry such as water wetting surfactants, non-emulsifiers and the like. As noted for these compositions and methods, the base fluid can also contain other non-conventional additives which can contribute to the breaking action of the VES fluid, and which are added for that purpose.

In a typical fracturing operation, the fracturing fluid is pumped at a rate sufficient to initiate and propagate a fracture in the formation and to place propping agents into the fracture. A typical fracturing treatment would be conducted by mixing a 20.0 to 60.0 gallon/1000 gal water (volume/volume—the same values may be used with any SI volume unit, e.g. 60.0 liters/1000 liters) amine oxide VES, such as SurFRAQ, in a 2 to 7% (w/v) (166 lb to 581 lb/1000 gal, 19.9 kg to 70.0 $kg/m^3$) KCl solution at a pH ranging from about 6.0 to about 9.0. The breaking components are typically added before or during the VES addition using appropriate mixing and metering equipment, or if needed in a separate step after the fracturing operation is complete or on the fly when going downhole. One unique aspect of this novel breaking chemistry is how the plant, fish and like type oils and metallic particles may be added and dispersed within the brine mix water prior to the addition of VES, such as the suction side of common hydration units or blender tub pumps. These oils, used at the typical concentrations needed to achieve quick and complete break, do not initially act as detrimental oils and degrade VES yield and the like. However, most other oils have a detrimental effect to VES yield if already present or when added afterwards. One novelty of the enoic-type oils described herein is they are VES-friendly initially but over time and a given temperature become aggressive VES gel breakers, particularly as the metallic particles dissolve to release metal ions. By "VES-friendly" is meant they are compatible therewith and do not immediate decrease viscosity of aqueous fluids gelled with VES as is seen with most other oils.

In one embodiment, the method herein is practiced in the absence of gel-forming polymers and/or gels or aqueous fluids having their viscosities enhanced by polymers. However, combination use with polymers and polymer breakers may also be of utility. For instance, polymers may also be added to the VES fluids herein for fluid loss control purposes. Types of polymers that may serve as fluid loss control agents are various starches, polyvinyl acetates, polylactic acid, guar and other polysaccharides, gelatins, and the like.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of constituents of an alloy composition is applied to all of the listed constituents, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the alloy compositions described herein specifically discloses and includes the embodiments wherein the alloy compositions "consist essentially of" the named components (i.e., contain the named components and no other components that significantly adversely affect the basic and novel features disclosed), and embodiments wherein the alloy compositions "consist of" the named components (i.e., contain only the named components except for contaminants which are naturally and inevitably present in each of the named components).

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A method for breaking the viscosity of an aqueous fluid gelled with a viscoelastic surfactant (VES) comprising:
   providing an aqueous fluid that is a brine comprising KCl, NaCl, CaCl$_2$, or CaBr$_2$;
   adding to the aqueous fluid, in any order, components comprising:
      a VES comprising a non-ionic surfactant, cationic surfactant, amphoteric surfactant or zwitterionic surfactant, or a combination thereof, in an amount sufficient to form a gelled aqueous fluid comprising a plurality of elongated micelles,
      an unsaturated fatty acid comprising a monoenoic acid or a polyenoic acid; or a combination thereof; and
      a plurality of metal particles to produce a mixture comprising dispersed metal particles in the gelled aqueous fluid, the metal particles comprise coated metal particles comprising metal particle cores formed from a transition metal selected from Group VA, VIA, VIIA, VIIIA, IB, IIB, IIIB or IVB of the Periodic Table, or an alloy thereof, or a combination thereof that are configured for dissolution in the aqueous fluid to provide a source of transition metal ions and metal coating layers that are configured to selectively control access of the aqueous fluid to the metal particle cores;
   selectively controllable dissolution of the metal particles in the gelled aqueous fluid to provide the source of transition metal ions; and
   heating the gelled aqueous fluid to a temperature sufficient to cause the unsaturated fatty acid to auto-oxidize to products that reduce the viscosity of the gelled aqueous fluid, wherein the transition metal ions comprise an auto-oxidation rate control compound that controls an auto-oxidation rate of the unsaturated fatty acid.

2. The method of claim 1, wherein the polynoic acid comprises linoleic acid, omega-3 fatty acids, omega-6 fatty acids, stearidonic acid, eleostearic acid, eicosadienoic acid, eicosatrienoic acid, arachidonic acid or eicosatetraenoic acid, eicosapentaenoic acid, docosapentaenoic acid, docosahexaenoic acid, cis-linoleic acid, cis-linolenic acid, gamma-linolenic acid or conjugated polyenes, or a combination thereof, and wherein the monoenoic acid comprises obtusilic acid, caproleic acid, lauroleic acid, linderic acid, myristoleic acid, physeteric acid, tsuzuic acid, palmitoleic acid, petroselinic acid, oleic acid, vaccenic acid, gadoleic acid, gondoic acid, cetoleic acid, nervonic acid, erucic acid, elaidic acid or t-vaccenic acid, or a combination thereof.

3. The method of claim 1, wherein the transition metal ions are present in an amount of about 0.001 to about 4000 ppm of the gelled aqueous fluid.

4. The method of claim 1, wherein the particle cores comprise Fe, Cu, Mg, Mn, Co, Ca, Cr, Ti, Zn, Zr, Ni, V, Pt, Si, Sn, Al, Mo or Pd, or an alloy thereof, or a composite thereof, or a cermet thereof, or a combination thereof.

5. The method of claim 1, wherein the coating layers are metal layers selected from Al, Zn, Zr, Mn, Mg, Mo, Ti, Ni, Pt, Pd, W, V, Fe, Cu, Co, Cr, Si, Ca or Sn, or an oxide, carbide or nitride thereof, or a combination of any of the aforementioned materials, and wherein the coating layer has a chemical composition and the particle core has a chemical composition that is different than the chemical composition of the coating layer.

6. The method of claim 1, wherein the coating layers have an average thickness of about 0.5 nm to about 2500 nm.

7. The method of claim 1, wherein the metal particles have an average particle size of about 8 nm to about 250 μm.

8. The method of claim 1, wherein the metal particles have an average particle size of about 10 nm to about 20 μm.

9. The method of claim 1, wherein the metal particles have an average particle size of about 30 nm to about 10 μm.

10. The method of claim 1, wherein the products reduce the viscosity of the gelled aqueous fluid by disaggregating or rearranging a micelle structure of the VES.

11. The method of claim 1, wherein the effective temperature ranges from about 70° F. to about 300° F.

12. The method of claim 1, wherein the amount of unsaturated fatty acid ranges from about 500 to about 25,000 ppm based on the total fluid.

13. The method of claim 1, further comprising adding a second auto-oxidation rate control compound to the aqueous fluid.

14. The method of claim 13, wherein the second auto-oxidation rate control compound is configured to increase the rate of auto-oxidation.

15. The method of claim 14, wherein the second auto-oxidation rate control compound comprises a persulfate, percarbonate, perbromate, perborate, bromate, chlorite, chlorate, hypochlorite, urea peroxide, hydrogen peroxide or sodium bromide, or a combination thereof.

16. The method of claim 1, wherein the metal particles have a multimodal distribution of average particle sizes.

17. The method of claim 1, wherein the metal particles comprise nanostructured metal particles.

* * * * *